United States Patent
Jain et al.

(10) Patent No.: US 7,876,757 B2
(45) Date of Patent: Jan. 25, 2011

(54) ROUTER-ASSISTED FAST PROCESSING OF PACKET TERMINATION IN HOST

(75) Inventors: Vinit Jain, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2210 days.

(21) Appl. No.: 10/703,013

(22) Filed: Nov. 6, 2003

(65) Prior Publication Data

US 2005/0100010 A1    May 12, 2005

(51) Int. Cl.
*H04L 12/28* (2006.01)
*H04L 29/08* (2006.01)
*G06F 15/16* (2006.01)

(52) U.S. Cl. .................. 370/392; 725/119; 709/246; 713/154

(58) Field of Classification Search ................ 370/229, 370/230.1, 232, 235, 236, 351, 389, 392, 370/395.31, 395.54, 400, 401, 420, 432; 725/25–31, 78, 114, 119, 138; 713/153, 713/154, 160, 162
See application file for complete search history.

(56) References Cited

U.S. PATENT DOCUMENTS

| | | | |
|---|---|---|---|
| 5,566,170 A * | 10/1996 | Bakke et al. ................ 370/392 |
| 5,596,722 A * | 1/1997 | Rahnema .................... 709/241 |
| 5,649,108 A * | 7/1997 | Spiegel et al. ............... 709/241 |
| 5,675,741 A * | 10/1997 | Aggarwal et al. ............ 709/242 |
| 5,721,820 A * | 2/1998 | Abali et al. ................. 709/243 |
| 5,751,971 A * | 5/1998 | Dobbins et al. ............. 709/238 |
| 5,828,844 A * | 10/1998 | Civanlar et al. ............. 709/228 |
| 5,835,710 A * | 11/1998 | Nagami et al. .............. 709/250 |
| 5,917,820 A * | 6/1999 | Rekhter ..................... 370/392 |
| 5,995,503 A * | 11/1999 | Crawley et al. ............. 370/351 |
| 5,996,021 A * | 11/1999 | Civanlar et al. ............. 709/238 |
| 6,111,673 A * | 8/2000 | Chang et al. .................. 398/79 |
| 6,141,749 A * | 10/2000 | Coss et al. ................... 713/162 |
| 6,157,644 A * | 12/2000 | Bernstein et al. ............ 370/392 |
| 6,188,689 B1 * | 2/2001 | Katsube et al. ............. 370/389 |
| 6,246,683 B1 * | 6/2001 | Connery et al. ............. 370/392 |
| 6,256,314 B1 * | 7/2001 | Rodrig et al. ............... 370/401 |

(Continued)

OTHER PUBLICATIONS

Auerbach, Karl, "Fast Path Characterization Protocol (FPCP)," Sep. 19, 2000, http://www.cavebear.com/archive/fpcp/fpcp-sept-19-2000.html.*

*Primary Examiner*—Aung S Moe
*Assistant Examiner*—Curtis A Alia
(74) *Attorney, Agent, or Firm*—Dillon & Yudell LLP

(57) ABSTRACT

A last router in the route of a packet determines when a packet is at the last hop prior to reaching its destination, based on information conveyed in the routing table that the destination is a directly-connected host, and can then convey that information to the host by setting the TTL to zero in the packet being forwarded to its final destination. The host, being so informed that the packet is destined for its IP address, can thereby eliminate the IP address table search for the destination IP address of the incoming packet against the list of its allocated IP addresses to determine if the packet is destined for that host, thereby providing significant performance enhancements to the network system by enabling a receiving host to skip the IP address lookup process and immediately consume the received packet.

27 Claims, 6 Drawing Sheets

U.S. PATENT DOCUMENTS

| | | | | |
|---|---|---|---|---|
| 6,490,292 | B1* | 12/2002 | Matsuzawa | 370/401 |
| 6,578,087 | B1* | 6/2003 | Garakani et al. | 709/242 |
| 6,581,207 | B1* | 6/2003 | Sumita et al. | 725/46 |
| 6,665,611 | B1* | 12/2003 | Oran et al. | 701/213 |
| 6,765,872 | B1* | 7/2004 | Tazaki | 370/235 |
| 6,772,220 | B1* | 8/2004 | McVeigh | 709/238 |
| 6,785,735 | B2* | 8/2004 | Garakani et al. | 709/238 |
| 6,907,040 | B2* | 6/2005 | Matsuzawa | 370/401 |
| 6,907,042 | B1* | 6/2005 | Oguchi | 370/412 |
| 7,391,783 | B2* | 6/2008 | Jimmei et al. | 370/400 |
| 2002/0046271 | A1* | 4/2002 | Huang | 709/223 |
| 2002/0090007 | A1* | 7/2002 | Kamiya et al. | 370/476 |
| 2002/0191621 | A1* | 12/2002 | Jha | 370/401 |
| 2003/0067929 | A1* | 4/2003 | Matsuzawa | 370/401 |
| 2003/0086425 | A1* | 5/2003 | Bearden et al. | 370/392 |
| 2003/0088696 | A1* | 5/2003 | McCanne | 709/238 |
| 2003/0118051 | A1* | 6/2003 | Ooms | 370/471 |
| 2004/0008687 | A1* | 1/2004 | Matsubara | 370/395.21 |
| 2004/0044786 | A1* | 3/2004 | Basso et al. | 709/238 |
| 2004/0202199 | A1* | 10/2004 | Fischer et al. | 370/474 |
| 2005/0041674 | A1* | 2/2005 | Rooney | 370/401 |
| 2005/0180356 | A1* | 8/2005 | Gillies et al. | 370/329 |
| 2008/0117911 | A1* | 5/2008 | Rajakarunanayake et al. | 370/392 |

* cited by examiner

200

ROUTER-ASSISTED FAST PROCESSING OF PACKET TERMINATION IN HOST

TECHNICAL FIELD

The present invention is related in general to data transfers in data processing system networks and, in particular, to transfer of data blocks over the Internet or similar networks. Still more particularly, the present invention relates to improved performance of processing data packets received at a host over a network.

BACKGROUND

Networks provide for transmission of information from a source to a destination over a particular route. The information is transmitted along the route through routers. The information is transmitted throughout the network in accordance with a particular protocol and routers in the network may support any of a number of protocols. Typically, each router has knowledge of various routes available in the network and this knowledge is stored in a route database or route table. Thus, the router may store multiple routes, which are available using multiple protocols.

The Internet has become a particularly important network for transmission and distribution of data (text, code, image, video, audio, or mixed) and software. Users connect to the backbone of the Internet with broadly divergent levels of performance, ranging from 14.4 Kb/s to more than 45 Mb/s. Transmission Control Protocol/Internet Protocol (TCP/IP) has become a widely implemented standard communication protocol in Internet and Intranet technology, enabling broad heterogeneity between clients, servers, and the communications systems coupling them. Internet Protocol (IP) is the network layer protocol and Transmission Control Protocol (TCP) is the transport layer protocol. At the network level, IP provides a "datagram" delivery service. By contrast, TCP builds a transport level service over the datagram service to provide guaranteed, sequential delivery of a byte stream between two IP hosts.

Often, the hosts in a network operate both as a router and a host. Such hosts are able to forward packets that are destined for other hosts within the network. When a router/host server receives a packet over the network, it must spend considerable resources verifying whether the packet should terminate on the resident host or be sent forward to another addressed host. Processing resources and corresponding cost to make this verification substantially increases as the number of IP addresses belonging to the host increases. This results because the destination address in the packet must be compared with all the IP addresses associated with the host to confirm that the packet terminates on that host, or must be passed to the routing functionality of the host to calculate and execute a route for the packet to the ultimate destined host down the route. In large, busy systems with multiple IP addresses designated for the various hosts, there can be a considerable amount of processing resources expended on checking that a received packet contains a destination address of the host server.

SUMMARY OF THE INVENTION

In accordance with the present invention, improved methods, systems and articles of manufacture for assisting network packet processing in a destination host are disclosed. One preferred method of the present invention comprises the steps of receiving a data packet at a router over a network; determining if a destination host for the data packet is directly connected to the router or if the destination host is connected to the router through one or more other routers; setting an identifier in the data packet, if the destination host for the data packet is directly connected to the router; and transferring the data packet to the destination host, wherein the identifier is read by the destination host and informs the destination host that it is the destination for the data packet and to bypass a process to determine if the data packet is addressed to the destination host. Another preferred method of the present invention comprises the steps of receiving a data packet from a router at the destination host; determining if an identifier in the data packet has been set by the router that indicates that the destination host is directly connected to the router and thereby informs the destination host that it is the destination for the data packet; and bypassing a process to determine if the data packet is addressed to the destination host, if the identifier in the data packet has been set by the router.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention.

Figure 1:
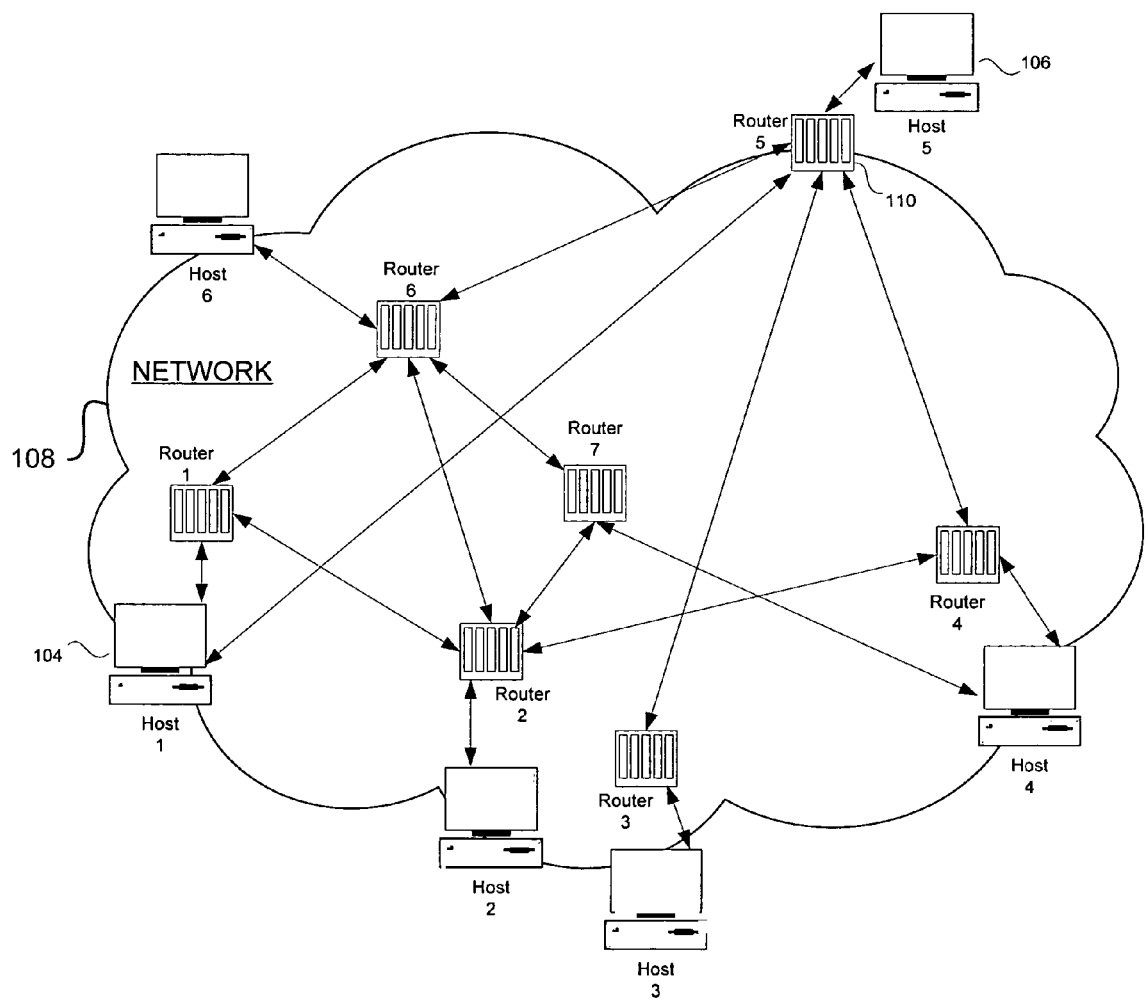
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 includes at least one host server system 104 coupled to at least one client/host server system 106 via at least one network 108 (such as the Internet) that includes at least one router 110. Data transfers between the server system 104 and server system 106 conform to the TCP/IP and UDP/IP specifications, as well as File Transfer Protocol (FTP), HyperText Transfer Protocol (HTTP), or some similar communications protocol. As will be appreciated, data processing system network 102 may include a number of host computers (Hosts 1-6) and a number of routers (Routers 1-7) and any number of other server and router systems (not shown) interconnected by one or more connections and networks (not shown), including network 108.

Network 108 such as the Internet is interconnected by many interconnected routers, which each connect two or more networks together. Typical routers comprise a special-purpose hardware box with input and output connections and dedicated hardware and/or embedded software that allow many different types of physical networks to be connected, such as Ethernet, token ring, point-to-point links, etc. A router has two or more network interface layers (since it connects two or more networks). Any system with multiple interfaces is called multi-homed. Most TCP/IP implementations allow a multi-homed host to act as a router and specifically forward packets from one interface to another, but the host needs to be specifically configured to support this use. In such instances, the system is either a host (when an application such as FTP or Telnet is being used) or a router (when it's forwarding packets from one network to another).

Figure 2:
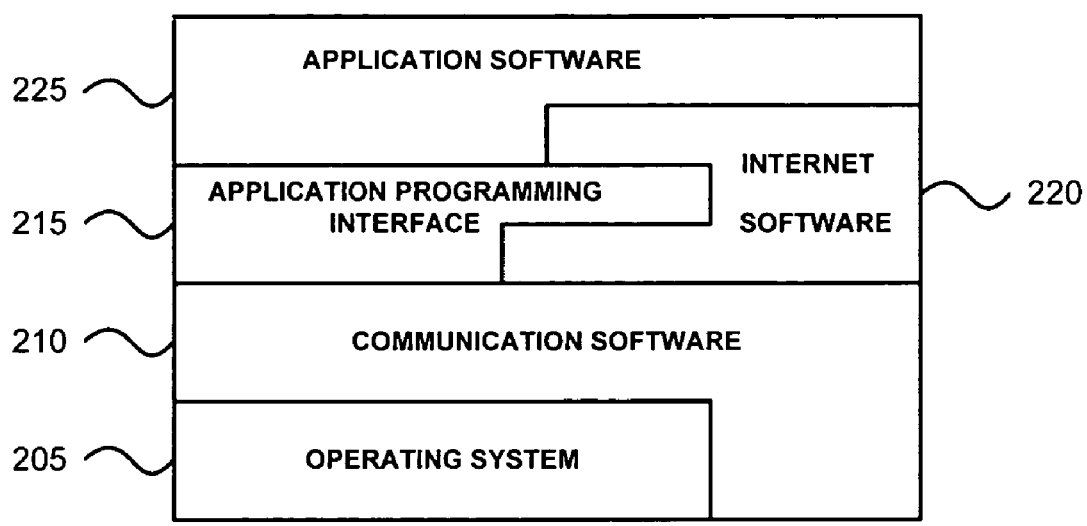
FIG. 2 is a depiction of a 4-layer communications architecture for a network, as may be utilized in a preferred embodiment of the present invention.

As shown in FIG. 2, network 108 utilizes a 4-layer communications architecture 200 for the network comprising an application layer 210, a transport layer 212 a network layer 214, and a link layer 216. Each layer is responsible for handling various communications tasks, as follows. The link layer 216 (also referred to as the data-link layer or the network interface layer) normally includes the device driver in the operating system and the corresponding network interface card in the network computer such as servers 104, 106. Together they handle all the hardware details of physically interfacing with the network media being used, e.g. Ethernet cable, etc. The network layer 214 (also referred to as the internet layer) handles the movement of packets of data around the network. For example, the network layer handles the routing of the various packets of data that are transferred over the network. The network layer in the TCP/IP suite is comprised of several protocols, including IP (Internet Protocol), ICMP (Internet Control Message Protocol), and IGMP (Internet Group Management Protocol).

The transport layer 212 provides an interface between the network layer 214 and the application layer 210 that facilitates the transfer of data between two host computers. The transport layer is concerned with things such as dividing the data passed to it from the application into appropriately sized chunks for the network layer below, acknowledging received packets, setting timeouts to make certain the other end acknowledges packets that are sent, etc. In the TCP/IP protocol suite there are two distinctly different transport protocols: TCP (Transmission Control Protocol) and UDP (User Datagram Protocol). TCP provides reliability services to ensure that data is properly transmitted between two hosts, including dropout detection and retransmission services. Conversely, UDP provides a much simpler service to the application layer by merely sending packets of data called datagrams from one host to the other without providing any mechanism for guaranteeing that the data is properly transferred. When using UDP, the application layer must perform the reliability functionality.

The application layer 210 handles the details of the particular application. There are many common TCP/IP applications that almost every implementation provides, including (1) Telnet for remote login; (2) FTP (File Transfer Protocol); (3) SMTP, the Simple Mail Transfer protocol, for electronic mail, and (4) SNMP, the Simple Network Management Protocol. When an application sends data using TCP/IP, the data is sent down a protocol stack, through each layer, until it is sent as a stream of bits across the network. Each layer adds information to the data by prepending headers (and sometimes adding trailer information) to the data that it receives. Within the IP header of a data packet is a Time To Live (TTL) field, which is responsible for limiting the number of hops a datagram may make through a network. This field decrements at each networking node in the network. If this field reduces to zero before reaching the desired destination, the datagram is dropped. This mechanism prevents infinite looping between two networking nodes because of some routing error.

Figure 3:
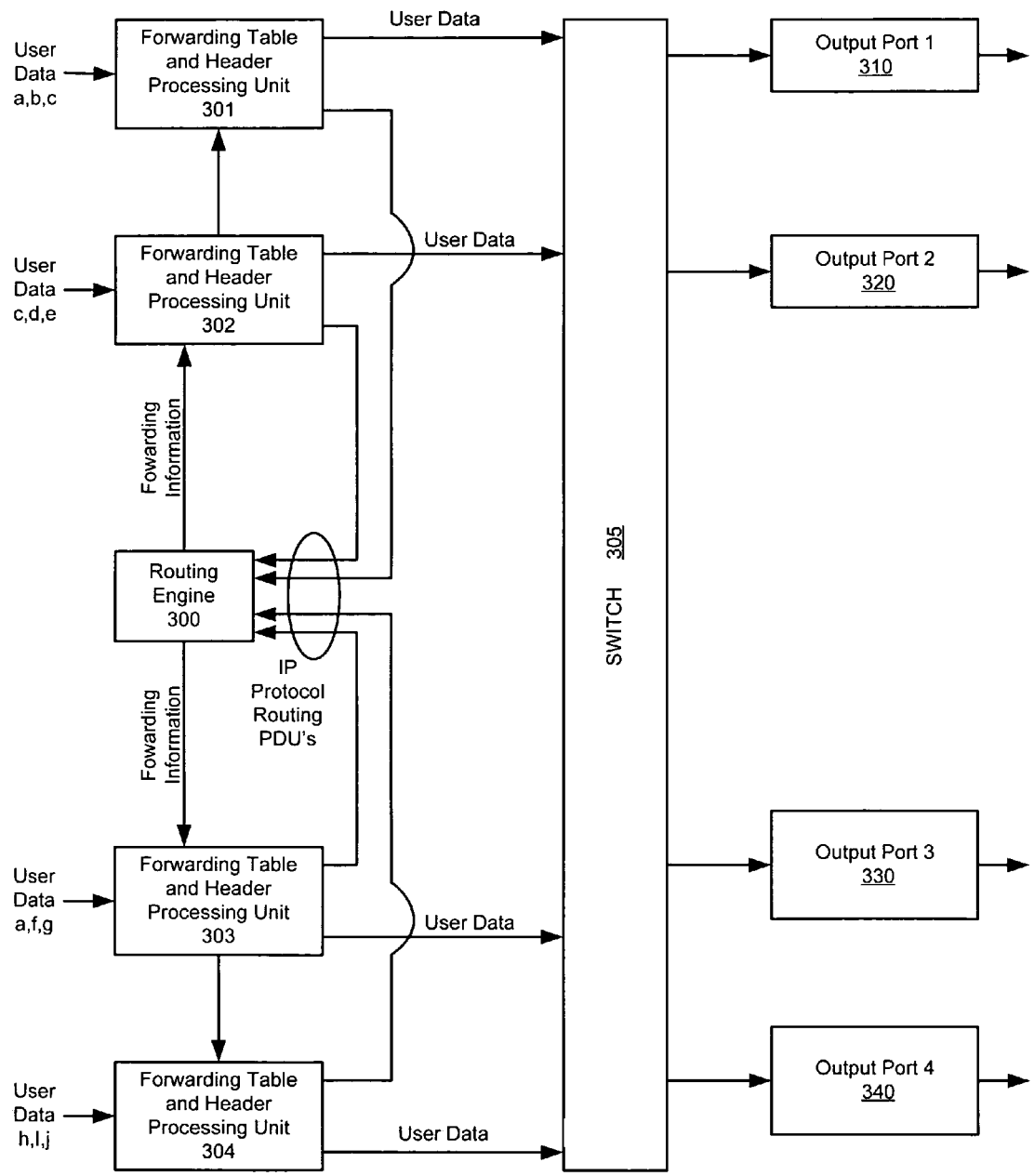
FIG. 3 shows a block diagram of the hardware in a router required to accept and forward an datagram in a networking node, in accordance with a preferred embodiment of the present invention.

FIG. 3 shows a block diagram of the hardware in a router required to accept and forward an IP datagram in an IP networking node, in accordance with a preferred embodiment of the present invention. The IP networking node or router (for example, router 110) must first process the IP header of the incoming packet. The egress interface of the datagram is determined based on the incoming Destination Address in the incoming IP datagram. Once a header is verified, the data is either sent to another port in the networking node or to a routing engine within the networking node. A typical architecture of a router networking node is implemented with a routing engine 300 connected to multiple interfaces of the networking node. All IP Routing Protocol data destined for the router are forwarded to the routing engine 300 by all ingress ports via forwarding table and header processing units 301-304. The routing engine 300 examines the Routing Protocol PDUs and learns destination network addresses of the various networks, and then calculates the egress interface number for the network addresses. The destination network address and egress interface number form an entry into the Forwarding Table (as shown by the example of Forwarding Table 404 in FIG. 4) in forwarding table and header processing units 301-304. The routing engine 300 then sends the Forwarding Table or updates thereof to each ingress interface, thereby instructing each ingress header processing unit (units 301-304 in FIG. 3) how to determine the exit interface of each incoming datagram. Each ingress header processing unit will then verify every datagram, examine the destination field, and then index the destination in the Forwarding Table to determine the egress port number of the datagram.

An exemplary process will now be detailed, using the high level networking node diagram of FIG. 3. IP packets passing through the network are processed by each router and routing host to determine the packet's next hop in the network. Assuming some combinations of IP Routing Protocols, routers attached respectively on the other side of units 301, 302, 303 and 304 are advertising reachability to network addresses a, b and c, to network addresses c, d and e, to network addresses a, f and g, and finally, to network addresses h, i, and j, respectively. In this simple example, the routing engine 300 sees multiple exit or output ports, labeled as Output Ports 1-4 (310-340). The routing engine 300 will decide, based on one of many options, such as cost, hop count, etc., the best exit port to reach destination network address 'a' and destination network address 'c', for example. Assuming for this example that the routing engine 300 chooses the interface to port 310 for the forwarding of all datagrams destined for network address 'a', and it chooses port 320 for the forwarding of all datagrams destined for network address 'c', the routing engine 300 will thereupon create the Forwarding Table 404 shown in FIG. 4. In practice, the Forwarding Tables on a backbone router can extend to tens of thousands of entries.

Figure 4:
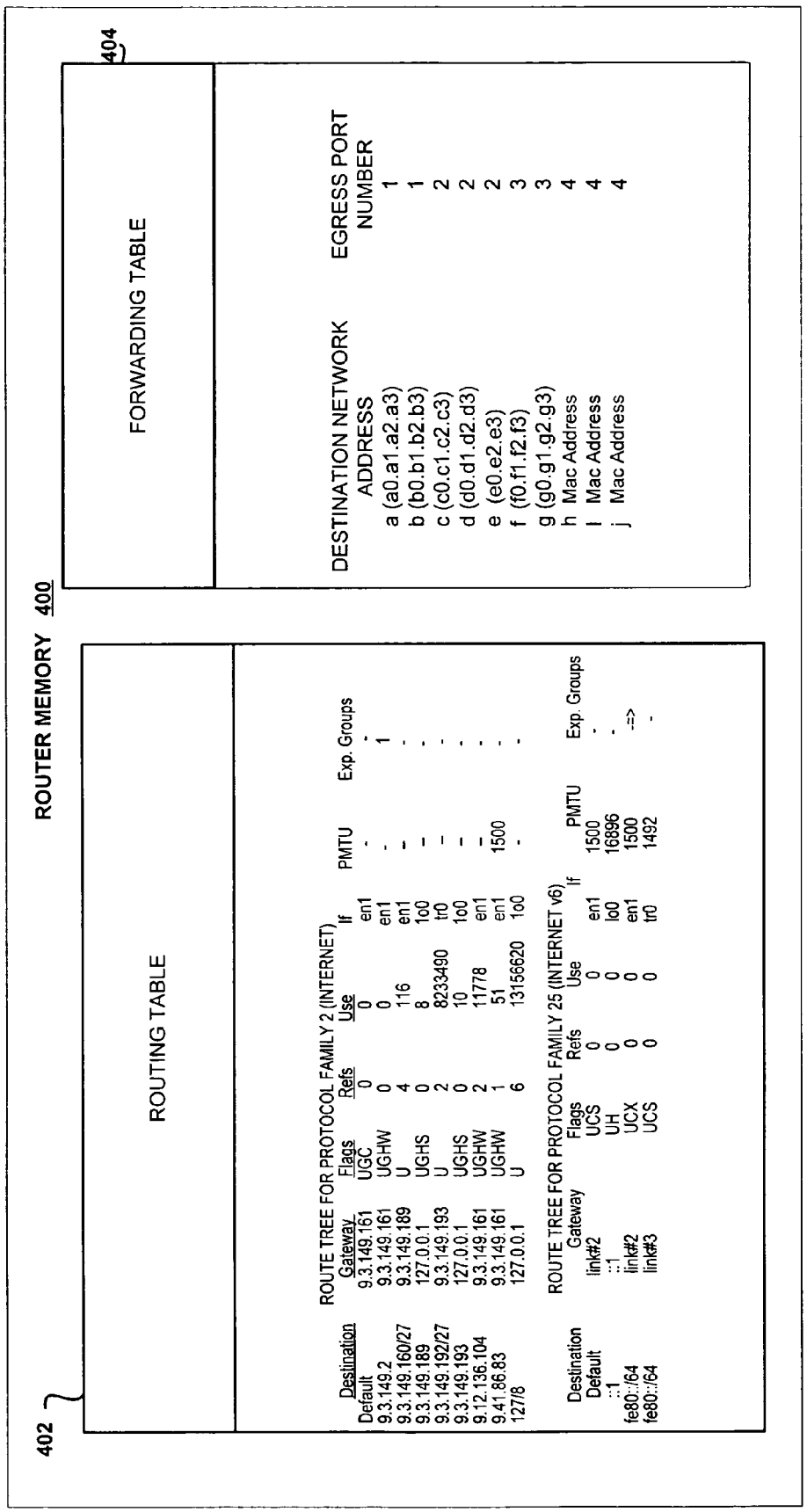
FIG. 4 shows a block diagram of routing and forwarding tables in router memory, in accordance with a preferred embodiment of the present invention.

Each network address in FIG. 4 is listed within parenthesis as four numbers, which represents the real network address as four bytes. The Forwarding Table is then forwarded to each input or ingress data port (301-304) by the routing engine 300 to permit the forwarding table and header processing units 301-304 to examine all incoming datagrams and match the destination address in the Forwarding Table, and thereby determine the corresponding appropriate output or egress interface port 310, 320, 330, 340. The datagram is then sent to that output port via the switch 305. As part of this forwarding process, header processing units 301-304 within each router decrements the TTL field within the EP header before forwarding a received packet. If this field has reached zero, the router will drop the packet, instead of forwarding it on.

In accordance with the preferred embodiment, as part of the routing process, header processing units 301-304 review the routing table 402 within the router memory 400 to determine the gateway address of the next router in the packet's route, and, if the flags in the routing table indicate that the addressed destination is a host server connected within the router's directly-connected subnet, the router concludes that the gateway address is the final destination of the packet. This is shown in routing table 402, where a "G" flag within the "Flags" column indicates that the specified gateway address for the destination address entry is directed to a router attached to a port 310-340. Where a gateway address does not have an associated "G" flag, the router concludes that the specified gateway address is a directly-connected host within the router subnet attached to a port 310-340.

In accordance with a preferred embodiment, when the routing table indicates that the destination address is on the router's subnet, the header processing unit 301-304 sets the TTL in the IP header of the data packet to "0" prior to forwarding, instead of decrementing the TTL as is specified by the IP protocol. The header processing unit 301-304 receiving the data packet will search the ARP (Address Resolution Protocol) table to convert the IP address of the packet into a physical address at the link layer (for example, DLC (Data Link Control) layer) to uniquely identify a node on the network for the directly-connected destination host. In a preferred embodiment, the router and switch communicate with the host on the subnet using an IEEE 802-compliant protocol such as Ethernet, and the DLC layer specifies the Media Access Control (MAC) address. The forwarding table 404 is searched for an egress port number associated with the destination network address corresponding to the MAC address of the destination host. The corresponding header processing unit 301-304 then forwards the packet through switch 305 to the indexed Output Port 1-4 (310-340) that is directly connected to the destination host at the MAC address. In the example shown in FIG. 4, forwarding table 404 indicates that the MAC address is connected to egress port 4. Accordingly, switch 305 directs the packet to output port 4 (340) for routing directly to the host.

Upon receiving a packet at a destination host, the transport layer within the host unpacks the packet and immediately detects the value of the TTL. If the TTL is set to 0, the host is automatically informed that the packet has reached its destination and that an application running on that host is the consumer of the packet. In the preferred embodiment, the TTL is set to zero to indicate the host as the destination because this value is a number that the router already checks and modifies and is not normally set to zero and forwarded (it would be dropped). The use of the TTL is advantageous because the TCP/IP protocols do not need to be modified and it is a value processed at every node. However, it should be understood that another value in the packet could be modified or created to provide the host with the information conveyed in the present invention. Therefore, in accordance with a preferred embodiment, when a packet with a TTL set to zero is received, the host bypasses the standard packet processing that requires a search of the IP address table of the host to determine whether the packet is intended for that host or is to be forwarded on, and assumes that the IP address of the packet belongs to the host. Bypassing this searching process can save considerable amounts of processing time and resources within the host. In accordance with the preferred embodiment, the host bypasses the IP address table search and immediately begins to compare the source/destination addresses and source/destination port pairs within the TCP/IP headers of the packet with the connections specified by the TCP sockets residing on the host. When a match occurs, the packet is forwarded to the requesting socket to be consumed by the corresponding application on the host. In rare instances, the source/destination pairs will not match to any TCP socket on the host, and the host will immediately discard the packet, since the TTL has reached 0.

As can be seen, the preferred embodiment of the present invention provides significant performance enhancements to the network system by enabling a receiving host to skip the IP address lookup process and immediately consume the received packet. This is accomplished by recognizing that the last router in the route of a packet can easily determine when a packet is at the last hop prior to reaching its destination, based on information conveyed in the routing table, and can then convey that information to the host by setting the TTL to zero in the packet being forwarded to its final destination. The host, being so informed that the packet is destined for its IP address, can thereby eliminate the IP address table search for the destination IP address of the incoming packet against the list of its allocated IP addresses to determine if the packet is destined for that host.

Figure 5:
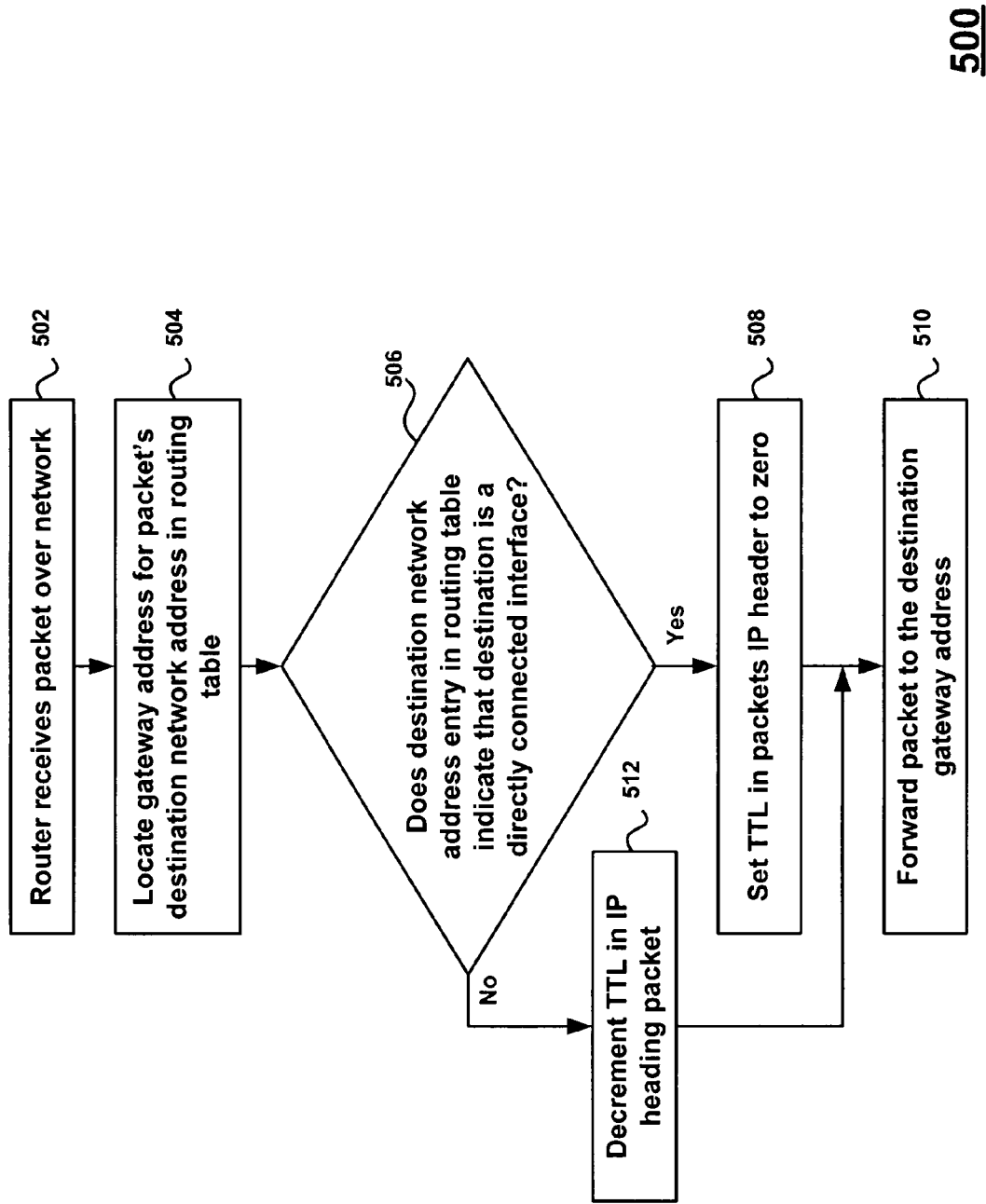
FIG. 5 shows a flow diagram of a process within a router for assisting fast processing within a host, in accordance with a preferred embodiment of the present invention.

With reference to FIG. 5, there is shown a flow diagram of a process within a router for assisting fast processing within a host, in accordance with a preferred embodiment of the present invention. The process 800 begins when a router receives a packet over the network (502). Upon receiving the packet, the router will search the router's routing table to locate the indicated gateway address of the route for the destination address of the packet (504). Upon locating the destination address' gateway address in the routing table, the router determines whether the routing table entry has a flag set indicating that the gateway route for the destination address is a directly-connected host at the router's interface, or indicating that the gateway address for the route leads to another router (506). If the destination host is directly connected to the router, the router will set the TTL in the packet's IP header to zero (508), and then will forward the packet to the directly connected destination host (510). If the routing table indicates that the route for the destination address leads to a connected gateway, and not a host, the TTL in the IP header of the packet is decremented (512), and the packet is forwarded directly to the router through the gateway address (510).

Figure 6:
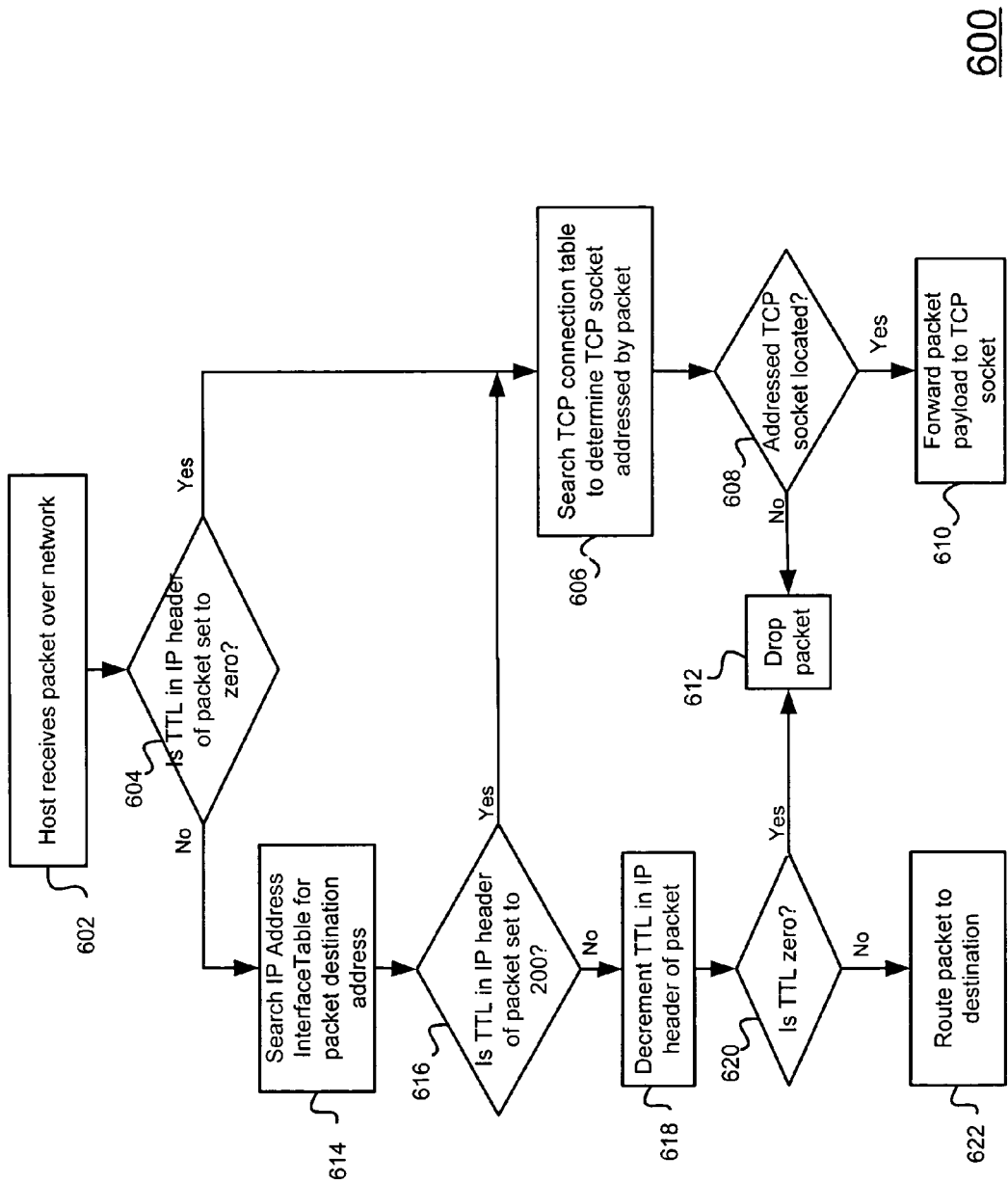
FIG. 6 shows a flow diagram of a process within a host for router-assisted fast processing of incoming packets, in accordance with the preferred embodiment of the present invention.

With reference to FIG. 6, there is shown a flow diagram of a process within a host for router-assisted fast processing of incoming packets, in accordance with the preferred embodiment of the present invention. Process 600 begins when the host receives a packet over the network (602). Upon receipt of the packet, the host unpacks the IP header and determines if the value of the TTL in the IP header is zero (604). If the TTL in the IP header is set to zero, the host bypasses the search of the IP address interface table and immediately begins searching the TCP connection table to determine the TCP socket addressed by the packet (606). If the addressed TCP socket is located within the TCP connection table (608), the host forwards the packet payload directly to the addressed TCP socket (610). If the 4-tuple (source/destination address, source/destination ports) are not matched within the TCP connection table (608), the process within the host has ownership over the packet, then the packet is dropped in the host (612). Returning to decision block 604, if it is determined that the TTL in the IP header is not set to zero, the host will search the IP address interface table for the packet's destination address (614). If it is determined that the packet's destination address is in the IP address interface table (616), the process passes to step 606, where the TCP connection table is searched to determine the TCP socket addressed by the packet. If it is determined that the packet's destination address is not in the IP address interface table at (616), the TTL in the IP header of the packet is decremented (618). It is then determined if the TTL has reached zero (620), and the packet is either dropped if the TTL has reached zero (612), or the packet is routed to the ultimate destination of the packet (622).

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. A method in a router for assisting network packet processing, said method comprising:
   in response to a receipt of a data packet at said router, the router determining by reference to a routing table at the router if a destination host for said data packet is directly connected to said router or if said destination host is connected to said router via one or more other routers;
   in response to a determination that said destination host for said data packet is directly connected to said router, the router setting an identifier field within a header of said data packet to a first value, wherein said identifier field is a Time To Live field read by said destination host to determine whether it is a destination for said data packet such that a process for determining if said data packet is addressed to said destination host is bypassed; and
   in response to a determination that said destination host for said data packet is connected to said router via one or more other routers, the router decrementing said identifier field within said header of said data packet to a second value different than said first value.

2. The method of claim 1, wherein said decrementing further includes decrementing said identifier field within said header of said data packet by one.

3. The method of claim 1, wherein said determining further includes checking if a flag in the routing table at said router is set.

4. The method of claim 1, wherein the header is a network layer header.

5. The method of claim 4, and further comprising:
   in response to a receipt of the data packet from the router at a destination host, the destination host determining if the identifier field within the header of said data packet has been set by said router to indicate that said destination host is a destination for said data packet;
   in response to a determination that said identifier field has not been set by said router, searching an address interface table for a destination address of said data packet; and
   in response to a determination that said identifier field has been set by said router:
      the destination host bypassing the searching and determining a socket of the destination host to which the data packet is to be forwarded; and
      the destination host forwarding the data packet to the determined socket.

6. A method in a destination host for processing router-assisted network packets, said method comprising:
   in response to a receipt of a data packet from a router at said destination host, the destination host determining if an identifier field within a header of said data packet has been set by said router to a session-independent value to indicate that said destination host is a destination for said data packet, wherein the identifier field is a Time To Live field;
   in response to a determination that said identifier field has not been set to the session-independent value by said router, searching an address interface table for a destination address of said data packet; and
   in response to a determination that said identifier field has been set to the session-independent value by said router:
      the destination host bypassing the searching and the destination host determining a socket of the destination host to which the data packet is to be forwarded; and
      the destination host forwarding the data packet to the determined socket.

7. The method of claim 6, and further comprising the destination host decrementing said identifier field if said destination address of said data packet is not located in said address interface table.

8. The method of claim 7, and further comprising:
   the destination host determining whether or not said identifier field has a value of zero after said decrementing; and
   the destination host dropping said data packet in response to a determination that said identifier field has a value of zero after said decrementing.

9. The method of claim 6, and further comprising the router determining by reference to a routing table at the router if the destination host is a destination host of the data packet, and responsive to so determining, setting the identifier field to indicate that said destination host is the destination for the data packet.

10. The method of claim 6, wherein the header is a network layer header.

11. A router for assisting network packet processing in a destination host, said router comprising:
a routing table; and
a processing unit that, in response to a receipt of a data packet at said router, determines by reference to the routing table if a destination host for said data packet is directly connected to said router or if said destination host is connected to said router via one or more other routers;
wherein the processing unit sets a value in an identifier field within a header of said data packet to a first value in response to a determination by reference to the routing table that said destination host for said data packet is directly connected to said router, wherein said identifier field is a Time To Live field read by said destination host to determine whether it is a destination for said data packet such that a process for determining if said data packet is addressed to said destination host is bypassed, and wherein the processing unit decrements said value in said identifier field in response to a determination that said destination host for said data packet is connected to said router via one or more other routers.

12. The router of claim 11, wherein said processing unit decrements said identifier within said header of said data packet by one.

13. The router of claim 11, wherein said processing unit further checks if a flag in the routing table at said router is set.

14. The router of claim 11, wherein the header is a network layer header.

15. A system, comprising:
the router of claim 14; and
a destination host coupled to the router, said destination host comprising:
an address interface table; and
a processor that, in response to a receipt of a data packet from a router at said destination host, determines if an identifier field within a header of said data packet has been set by said router to a session-independent value to indicate that said destination host is a destination for said data packet;
wherein the processor, responsive to a determination that said identifier field has not been set to the session-independent value by the router, searches the address interface table for a destination address of said data packet, and responsive to a determination that said identifier field has been set to the session-independent value by said router, bypasses the searching, determines a socket of the destination host to which the data packet is to be forwarded, and forwards the data packet to the determined socket.

16. A destination host for processing router-assisted network packets, said destination host comprising:
an address interface table; and
a processor that, in response to a receipt of a data packet from a router at said destination host, determines if an identifier field within a header of said data packet has been set by said router to a session-independent value to indicate that said destination host is a destination for said data packet, wherein the identifier field is a Time To Live field;
wherein the processor, responsive to a determination that said identifier field has not been set to the session-independent value by the router, searches the address interface table for a destination address of said data packet, and responsive to a determination that said identifier field has been set to the session-independent value by said router, bypasses the searching, determines a socket of the destination host to which the data packet is to be forwarded, and forwards the data packet to the determined socket.

17. The destination host of claim 16, wherein the processor decrements said identifier field if said destination address of said data packet is not located in said address interface table.

18. The destination host of claim 17, wherein the processor determines whether or not said identifier field has a value of zero after said decrementing, and if so, drops said data packet.

19. The destination host of claim 16, wherein the header is a network layer header.

20. An article of manufacture, comprising:
a non-transitory machine-readable storage medium; and
computer program code stored within the non-transitory machine-readable storage medium for assisting network packet processing within a network, wherein said computer program code causes a router to perform:
in response to a receipt of a data packet at said router, the router determining by reference to a routing table at the router if a destination host for said data packet is directly connected to said router or if said destination host is connected to said router via one or more other routers;
the router setting a value in an identifier field within a header of said data packet to a first value in response to a determination that said destination host for said data packet is directly connected to said router, wherein said identifier field is a Time To Live field read by said destination host to determine whether it is a destination for said data packet such that a process for determining if said data packet is addressed to said destination host is bypassed; and
the router decrementing said value in said identifier field within said header of said data packet to a second value different than said first value in response to a determination that said destination host for said data packet is connected to said router via one or more other routers.

21. The article of manufacture of claim 20, wherein said computer program code decrements said identifier field within said header of said data packet by one.

22. The article of manufacture of claim 20, wherein said determining further includes said computer program code checking if a flag in the routing table at said router is set.

23. The article of manufacture of claim 20, wherein the header is a network layer header.

24. An article of manufacture, comprising:
a non-transitory machine-readable storage medium; and
computer program product stored within the non-transitory machine-readable storage medium for processing router-assisted network packets within a network, wherein said computer program code causes a destination host to perform:
in response to a receipt of a data packet from a router at said destination host, determining if an identifier field within a header of said data packet has been set to a session-independent value by said router to indicate that said destination host is a destination for said data packet, wherein the identifier field is a Time To Live field;
searching an address interface table for a destination address of said data packet in response to a determination that said identifier field has not been set to the session-independent value by said router; and
in response to a determination that said identifier field has been set to the session-independent value by said router:

bypassing the searching and determining a socket of the destination host to which the data packet is to be forwarded; and forwarding the data packet to the determined socket.

25. The article of manufacture of claim 24, wherein said computer program code decrements said identifier field if said destination address of said data packet is not located in said address interface table.

26. The article of manufacture of claim 24, wherein said computer program code determines whether or not said identifier field has a value of zero after said decrementing and drops said data packet in response to a determination that said identifier field has a value of zero after said decrementing.

27. The article of manufacture of claim 24, wherein the header is a network layer header.

* * * * *